(12) United States Patent
Roden et al.

(10) Patent No.: US 6,364,429 B1
(45) Date of Patent: Apr. 2, 2002

(54) VEHICLE BRAKE BOOST ASSIST CONTROL

(75) Inventors: Mark P Roden, Fenton; Bryan Todd Fulmer, Byron; Joseph Allen Elliott, Plymouth, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/677,407

(22) Filed: Oct. 2, 2000

(51) Int. Cl.$^7$ ................................................ B60T 8/44
(52) U.S. Cl. ................................ 303/114.3; 303/113.3; 303/115.2
(58) Field of Search ........................... 303/113.3, 114.1, 303/114.3, 115.2

(56) References Cited

U.S. PATENT DOCUMENTS

| | | |
|---|---|---|
| 5,938,297 A | 8/1999 | Whaite et al. |
| 6,033,038 A | 3/2000 | Kulkarni et al. |

OTHER PUBLICATIONS

Y. Khan et al., "Modeling, Experimentation an Simulation of a Brake Apply System", Journal of Dynamic Systems, Measurement, and Control, Mar. 1994, vol. 116/111.

"Brake Assist Systems", Automotive Engineering, Jun., 1997, pp. 53, 54.

Frank Markus, "Brake Assist Systems—When ABS Isn't Enough", Car & Driver, Dec., 1997, p. 177.

*Primary Examiner*—Christopher P. Schwartz
(74) *Attorney, Agent, or Firm*—Robert M. Sigler

(57) ABSTRACT

A substantially constant brake assist gain is provided in a vehicle braking system having a vacuum booster providing braking assist to a brake fluid master cylinder in response to an operator input braking force, even though the gain of the booster falls off from its maximum value in a non-linear manner in a runout initiating portion of the working vacuum range near zero booster vacuum. A brake fluid pump, such as is used in an ABS/TCS modulator, is used to supplement the booster output as it falls so as to maintain a constant, linear brake system gain into runout. In the runout initiating portion of the working vacuum range, a runout assist gain is derived from stored data expressing booster assist gain as a function of booster vacuum, and a target wheel pressure is calculated from the derived runout boost assist gain and a corresponding change in master cylinder pressure. A target wheel pressure error is calculated from the difference between the derived target wheel pressure and the master cylinder pressure and used to control the brake fluid pressure added by the pump to the master cylinder pressure.

3 Claims, 4 Drawing Sheets

VEHICLE BRAKE BOOST ASSIST CONTROL

TECHNICAL FIELD

The technical field of this invention is power assist in vehicle braking systems.

BACKGROUND OF THE INVENTION

A well known power assist apparatus for a fluid operated vehicle braking system inserts a vacuum brake booster between the operator input pedal and the master cylinder. The booster includes a mechanical through path to the master cylinder for braking force exerted by the vehicle operator but additionally includes a valve controlled vacuum actuator responsive to pedal position for augmenting the operator exerted force. The assist force generating mechanism is a differential pressure across a diaphragm between a pair of chambers, one of which is provided with air at lower than atmospheric pressure, generally from engine vacuum, and the other of which is provided by a controlled valve apparatus with air at a working pressure that increases from the engine vacuum level of the one chamber generally proportionally with vehicle operator input braking force through the brake pedal. As the operator input braking force increases, the differential pressure across the diaphragm likewise increases, and so does the braking assist force applied to the master cylinder.

Such systems are subject to a well known limitation in brake assist force known as runout. The source of operating pressure for the booster, whether derived from engine vacuum or from any other source of vacuum, pressure chamber of the booster reaches atmospheric pressure. When the booster is in a runout condition, additional operator input braking force, although it is itself transmitted through the booster to the master cylinder, produces no further increase in assist pressure, since atmospheric pressure is the highest pressure in the system. A simplified illustration of the. result is shown in FIG. 4, which plots the output force of the booster as a function of the input force from the vehicle operator. The total output force, which is the sum of the input force and the assist force generated by the booster, increases generally proportionally with the input force as shown in plot 100 until runout is achieved at point 104. Above this point, in the runout condition, the booster produces no additional assist force; and the total force thus increases at a lower rate due only to the increase in input force, as seen in plot 102. Since this change in the rate of increase in braking force is easily felt by the operator through the brake pedal, such brake boosters are generally designed so that runout is not reached during normal driving conditions; and a smooth, consistent braking feel is provided in brake operation. But vehicle designs are tending to produce smaller engine compartments, due to an increase in underhood equipment together with increased streamlining for improved fuel economy. Vacuum brake boosters tend to be bulky; and this bulkiness is aggravated by a need for the greater output force capacity needed for a higher runout point. A smaller booster will save valuable space in the engine compartment, if the booster output can be supplemented in runout.

Various ways of supplementing booster output in runout have been suggested. Most of these provide additional capacity to the booster through a higher vacuum level to the vacuum chamber or a positive pressure above atmospheric to the working chamber and thus involve an additional pump and other apparatus. This invention, however, has to do with an approach using equipment already on many, if not most, vehicles: the anti-lock braking system (ABS). U.S. Pat. No. 5,938,297 to Whaite et al, Method and Device for Brake Application, issued Aug. 17, 1999, describes the use of ABS/TCS brake fluid pump and modulators included in many vehicles for providing anti-lock braking and brake-based traction control (TCS) to provide supplementary braking pressure at the wheels during booster runout conditions. The system of the patent is disclosed as being responsive to a signal of a runout condition and an additional input force beyond that producing the runout condition to operate the ABS pump and modulator valves to provide additional brake fluid pressure at the wheel brakes to supplement that from the master cylinder so as to attempt to maintain a substantially linear relationship between input braking force from the vehicle operator and actual braking force at the wheel brakes when the vacuum booster is in runout.

But the system as described in the patent is not without potential for improvement. The coordination of braking force between the booster and the brake modulator valves to provide a total force increasing in a smooth linear fashion as the booster reaches runout has turned out to be a difficult matter. A very simple control algorithm based on the booster force model of FIG. 1 could, when booster vacuum sensor 33 signals no booster vacuum in the working chamber, multiply a signal of input braking force from the pedal force sensor 32 by a system gain constant to derive a target wheel brake pressure and subtract therefrom the master cylinder pressure from sensor 31. The difference would be the required additional brake fluid pressure to be provided by the modulator 20. But it turns out that, although such a simple control algorithm generally works to supplement the booster and provides substantially linear control once the booster is well into a runout condition, the onset of runout is not as clearly defined as the simple model implies. There is a region of operation just below the point at which booster vacuum reaches zero in which the response of the system loses linearity, quite noticeably. The result can be a brake "feel" that is unpleasant to a vehicle operator, and therefore undesirable. In addition, a pedal force sensor may not be available for a control as described above.

The invention is a method for providing a substantially constant brake assist gain in a vehicle braking system having a vacuum booster providing braking assist to a brake fluid master cylinder in response to an operator input braking force. The vacuum booster provides a booster gain having a maximum value equal to the substantially constant brake assist gain over a substantial portion of its working vacuum range but falling from the maximum value to a unitary value in a non-linear variation over a runout initiating portion of the working vacuum range. The method a brake fluid pump, senses booster vacuum and, responsive to a sensed booster vacuum in the runout initiating portion of the working vacuum range, (1) derives a runout boost assist gain from stored data expressing booster assist gain as a function of booster vacuum;
(2) derives a target wheel pressure from the derived runout boost assist gain and a corresponding change in master cylinder pressure;
(3) determines a target wheel pressure error from the difference between the derived target wheel pressure and the master cylinder pressure;
(4) activates the brake fluid pump and routing brake fluid from the master cylinder thereto; and
(5) provides means for controlling pressure of fluid from the brake fluid pump and controls said pressure in response to the target wheel pressure error.

In an embodiment of the invention, the stored data may comprise a piecewise linear approximation of the non-linear variation of booster assist gain as a function of booster vacuum in the runout initiating portion of the working vacuum range and the change in master cylinder pressure used in the derivation of target wheel pressure may be the difference between a currently sensed value of master cylinder pressure corresponding to a currently derived runout boost assist gain and an immediately preceding sensed value of master cylinder pressure.

SUMMARY OF THE INVENTION

The method of this invention overcomes the shortcoming of the prior art based on the discovery that the simple plot of booster output versus input force shown in FIG. 4 is not completely accurate in the vicinity of the onset of runout. A more accurate plot of vacuum booster output force as a function of input force appears in FIG. 5. This plot illustrates that runout does not occur suddenly, at a single point, when the working chamber pressure reaches atmospheric pressure. Rather, the output/input force slope starts to roll off somewhat below this point: e.g. at a vacuum level of about 2.5 inches; and the onset of runout is process spanning a range of booster vacuum adjacent the zero vacuum level. It is this roll-off which produces the non-linearity of a control algorithm based on the simplified model of FIG. 4. In addition, the linear increase in booster pressure due to additional driver input braking force in runout produces an output plot offset somewhat downward from the plot predicted by the simpler model of FIG. 4. The control method of this invention is based on the more accurate plot of FIG. 5 and is thus able to maintain linearity through the onset of runout and an output braking force plot in runout co-linear with that below runout. In addition, the method of this invention does not require a brake pedal force sensor and is thus adaptable to many more vehicles.

DESCRIPTION OF THE PREFERRED EMBODIMENT

Figure 1:
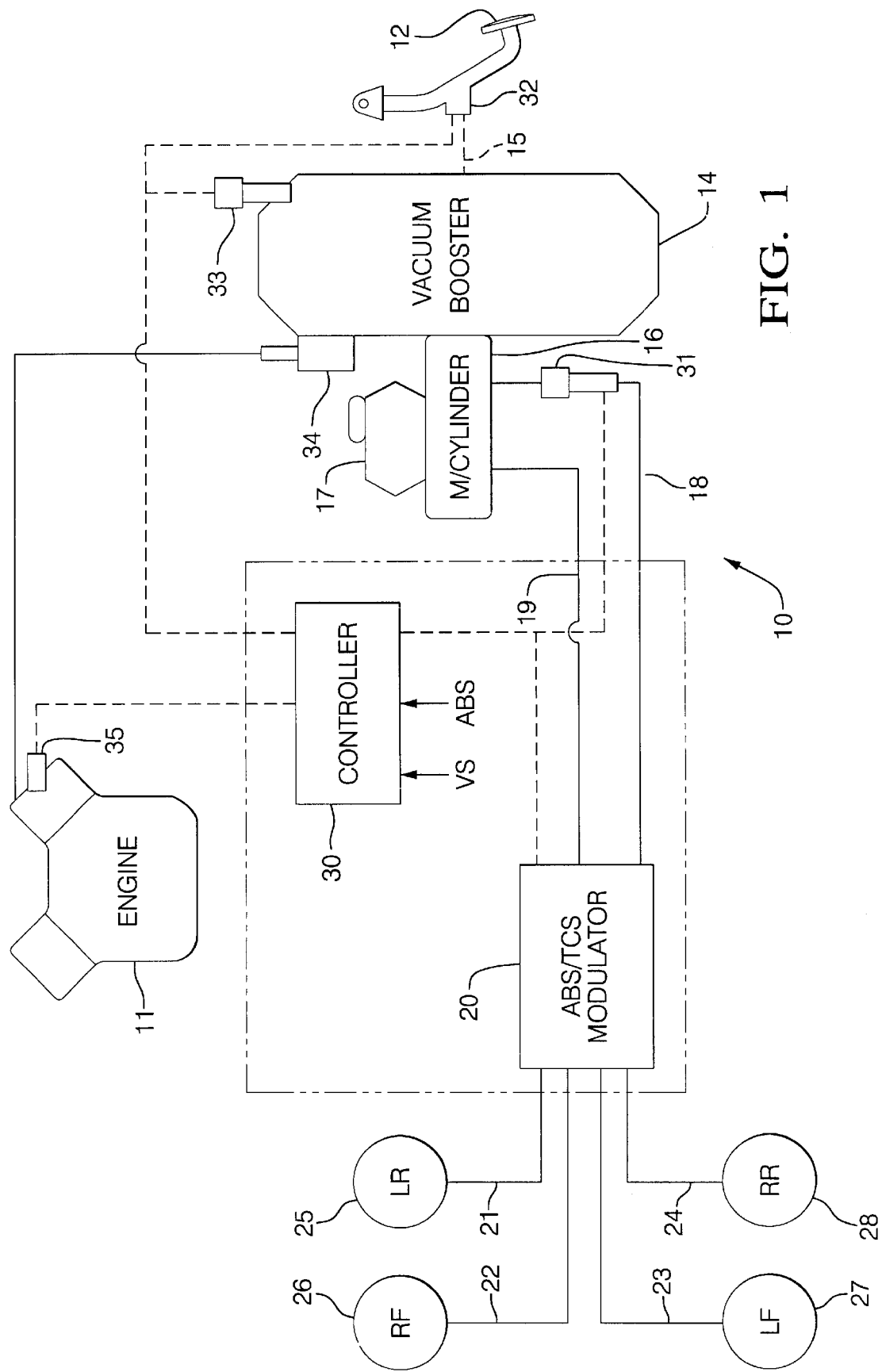
FIG. 1 is a schematic illustration of a brake system including a brake booster adapted for control by the method of this invention.

FIG. 1 illustrates a brake system 10 in combination with an engine 11. Brake system 10 includes a brake pedal 12 that provides input to a power booster 14 through a push-rod 15. The force applied to the push-rod by the operator is increased by booster and is communicated to a master cylinder 16. Master cylinder 16 includes a fluid reservoir 17 for supplying the brake fluid needs of brake system 10. Master cylinder 16 is of the conventional dual piston type wherein movement of master cylinder pistons in response to force exerted by booster 14 develops hydraulic pressure that is transmitted to a split brake system through brake lines 18 and 19. Brake lines 18 and 19 extend through an ABS/TCS modulator 20 and branch into brake lines 21–24 that connect with four wheel brakes 25–28.

An electronic controller 30 is provided for managing operation of brake system 10. Controller 30 communicates with modulator 20 and also with an engine sensor 35 and braking parameter sensors 31–33. Sensor 31 is a pressure sensor for monitoring the fluid pressure in brake line 18 as generated by master cylinder 16. Sensor 32 is a brake switch for indicating driver brake activation, or alternatively a force sensor for monitoring the manually applied brake pedal force, which may be used to provide the same information and more at additional cost. Sensor 33 is a vacuum sensor for monitoring the working vacuum/pressure level in the working chamber of booster 14. Sensor 35 is a manifold air pressure sensor for monitoring engine vacuum. A vacuum check valve 34 prevents loss of vacuum from booster 14 to engine 11 and may optionally include a vacuum sensor for a direct reading of the vacuum supplied to booster 14. Controller 30 is also provided with brake line pressure at wheel brakes 25–28 through conventional means. By monitoring and processing signals from the sensors, controller 30 is capable of detecting a booster runout condition: e.g. when sensor 33 indicates a pressure approaching atmospheric pressure.

Figure 2:
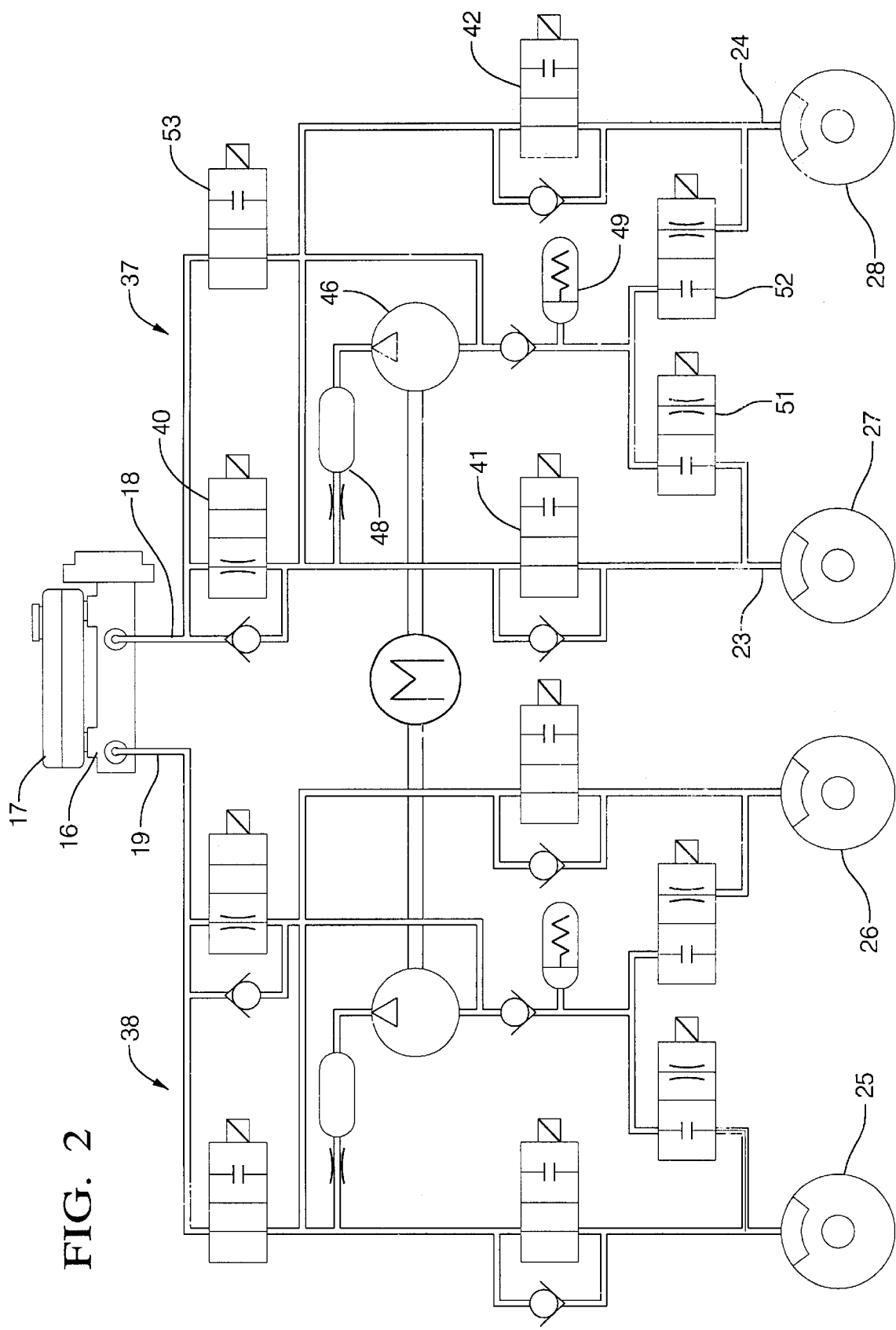
FIG. 2 is a detailed schematic illustration of the ABS/TCS modulator of FIG. 1.

FIG. 2 illustrates details of modulator 20. Brake lines 18 and 19 each extend into modulator 20 to provide a split braking system arrangement. In the present embodiment a diagonally split system is provided wherein brake line 18 supplies left front wheel brake 27 and right rear wheel brake 28 through channel 37, and brake line 19 supplies right front brake 26 and left rear brake 25 through channel 38. For simplicity of description, the details of channel 37 will be discussed with the understanding that the details of channel 38 are substantively the same and operate in the same manner.

Channel 37 supplies two wheel brakes through brake lines 23 and 24 with a direct connection normally being provided between master cylinder 16 and wheel brakes 27 and 28 through channel 37 when isolation valves 40 and apply valves 41 and 42 are in their open positions and release valves 51 and 52 and prime valve 53 are in their closed positions. In this normal condition, the manual application of force to brake pedal 12, shown in FIG. 1, actuates master cylinder 16 through push-rod 15 with power assist from booster 14 such that a braking pressure is generated in braking lines 18 and 19. This manually induced braking pressure is transmitted through channel 37, including isolation valve 40, apply valve 41 and apply valve 42, to wheel brakes 27 and 28. Brake line 24 may include an optional proportioner, not shown, for use in supplying braking pressure to rear wheel brake 28 in proportion to the pressure supplied to front wheel brake 27, when preferred. Through this normal base brake mode of operation, channel 37 enables the actuation of wheel brakes 27 and 28 directly in response to the manually actuated, power boosted master cylinder 16. Channel 38 operates similarly for base brake modes. Channel 37 also includes a pump 46, driven by motor M, and a damper assembly 48 provided on the outlet side of pump 46 to reduce the affects and noise pulsations created by pump 46. Release valves 51 and 52 are used in coordination with apply valves 41 and 42 for ABS and TCS operations, along with prime valve 53 and isolation valve 40, in the normal manner. Operation of the system during ABS and TCS events, as well as the well known structure and operation of booster 14, are described in the aforementioned U.S. Pat. No. 5,938,297, any relevant portions of which are incorporated by reference.

In this application, isolation valve 40 is provided with electrically controlled blow-off capability. A PWM signal controls a variable orifice so that the valve may be fill open or fully closed; but the fully closed position is achieved at less than 100% PWM so that the valve will be opened by fluid at a pressure controlled by the PWM signal. The direction of the blowoff is backward from the outlet of pump 46 to lines from master cylinder 18, which also communicates with prime valve 53. Functionally, it is very similar to the combination of isolation valve 40 and pressure relief valve 50 of the aforementioned U.S. Pat. No. 5,938,297.

When runout of booster 14 is detected by the control method to be described below, the operation of pump 46 is initiated or increased as required, and the prime valve 53 is opened to supply brake fluid under pressure from master cylinder 16 to the inlet of pump 46 for channel 37. Additionally, isolation valve 40 is closed so that the fluid supplied through apply valve 41 and 42 is now derived from the outlet of pump 46 at a pressure increased from that of master cylinder 16 by an amount added by pump 46. Isolation valve 40 limits and therefore controls the pump outlet pressure through its controlled blow-off capability, with the blown-off fluid recirculating through the prime valve or returning to the master cylinder. The motor driving pump 46 and variable blowoff of isolation valve 40 are controlled by controller 30 to provide an augmentation pressure from pump 46 sufficient, when added to the pressure in master cylinder, which itself equals the operator supplied pressure plus the maximum booster pressure in runout, totals a desired pressure, determined by the control, for linear operation.

For ease of communication and efficiency, controller 30 preferably provides all centralized braking and traction controls, including the control of this invention, in a common package including a microcomputer. But for ease and simplicity of explanation, controller 30 will be described as if it were dedicated to the control method of this invention, with reference to the flow chart of FIG. 3.

Figure 3:
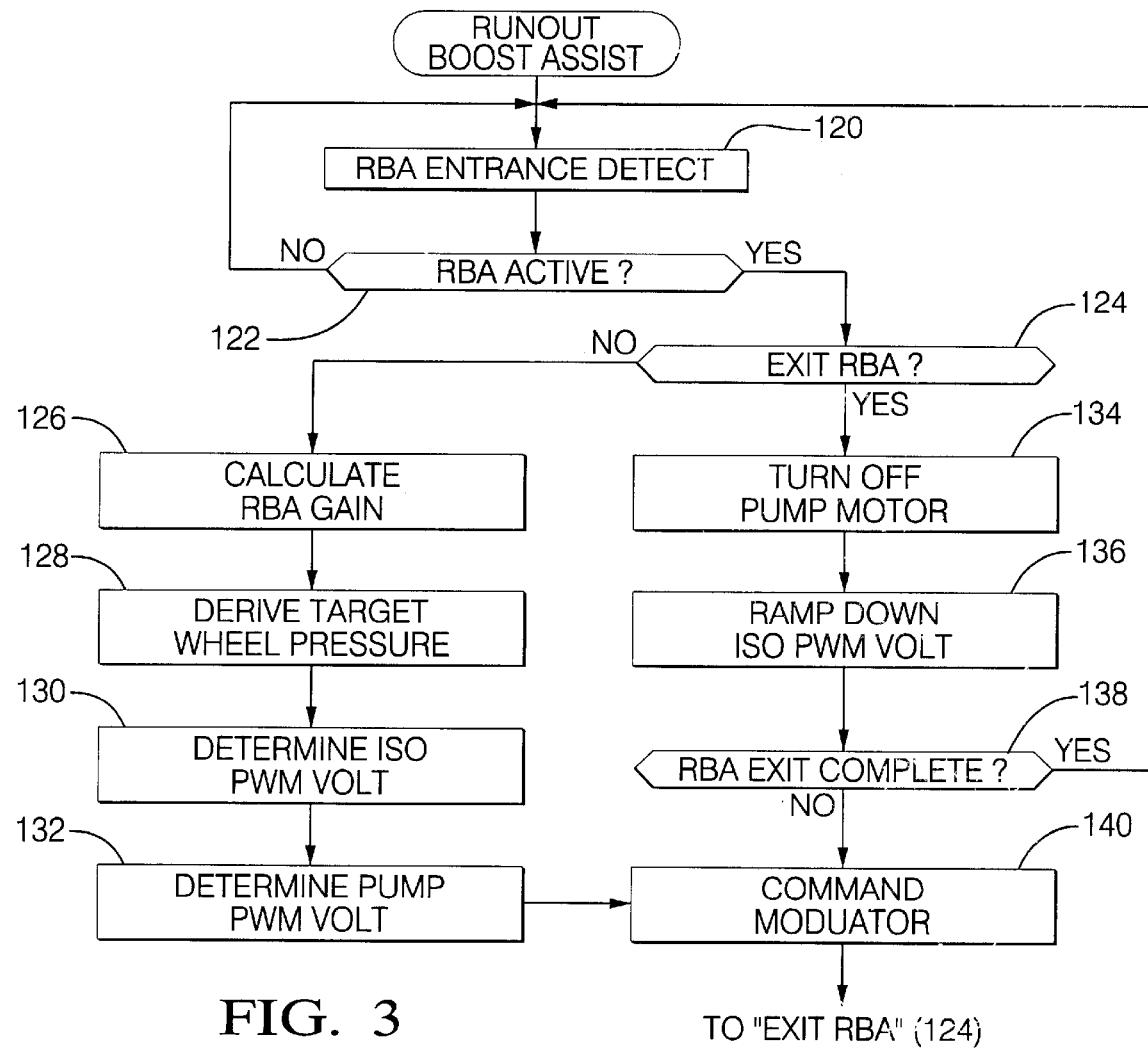
FIG. 3 is a flow chart illustrating the method of this invention using the ABS/TCS modulator of FIG. 2 in the brake system of FIG. 1.
Figure 4:
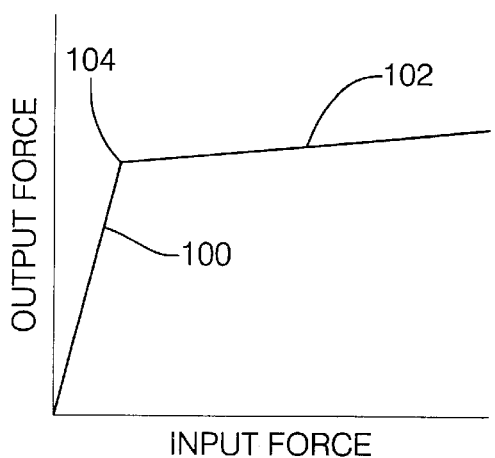
FIG. 4 is a plot of output force as a function of input force based on a simplified model of a vacuum brake booster, as known in the prior art.
Figure 5:
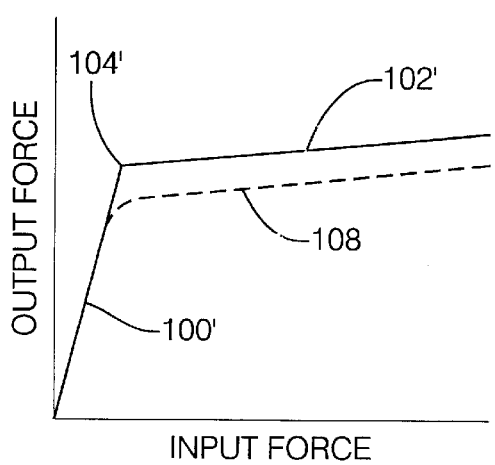
FIG. 5 is a plot of output force as a function of input force based on an actual vacuum brake booster.

Referring to FIG. 3, program RUNOUT BOOST ASSIST repeatedly checks a list of Runout Boost Assist (RBA) entry conditions in step 120, which may be accomplished in a subroutine. These conditions preferably include the following:

(1) Antilock Braking (ABS) is not active. It is not expected that boost assist beyond runout will be required while ABS is controlling the vehicle brakes, so RBA operation is not entered if ABS has already become active. But, as will be seen below, ABS will not end RBA control that has already started. If controller 30 integrates ABS control with this method, the ABS signal will be available within the controller. Otherwise it is provided as an input as shown in FIG. 1

(2) Vehicle speed must be above a reference, e.g. 5 kph. If controller 30 includes ABS or other controls, a vehicle speed signal will most probably be available internally. Otherwise it may be input as shown in FIG. 1.

(3) Booster vacuum must be below 3 inches (mercury). This provides an initial 0.5 inches of control initialization before the full control begins at 2.5 inches vacuum for any required pump speedup, as well as opening of prime valves. Booster vacuum is available from sensor 33.

(4) Master cylinder pressure must be increasing. Master cylinder pressure is available from sensor 31.

(5) Master cylinder pressure must be above a predetermined value, e.g. 50 psi.

(6) Brake switch must indicate operator brake activation. When all these conditions are true, an RBA flag will be set to indicate that RBA is active; and the current master cylinder pressure will be logged for use in the exit routine. The brake switch signal is available from sensor 32.

Next, the RBA flag is checked at step 122. If RBA is not active, the program returns to step 120 to check the entry conditions again. But if RBA is active, the program proceeds to check RBA exit conditions at step 124, which may also be a subroutine. These conditions are listed here:

(1) Master cylinder pressure is 50 psi less than the master cylinder pressure logged upon RBA entry, to provide hysteresis with respect to master cylinder pressure.

(2) Master cylinder pressure is less than 50 psi.

(3) Vehicle speed is less than 5 kph.

(4) Brake switch indicates that operator brake activation is no longer true.

When any of these exit conditions is met, RBA will go into its exit routine, to be described at a later point.

If RBA is not to be exited, an RBA gain is calculated in step 126, which is described with reference to the plots of FIG. 6. The calculation differs based on four distinct regions of booster vacuum:

(1) Between 3 and 2.5 inches booster vacuum, RBA gain is set to 1. In this small initialization region, no actual RBA adjustment is yet made; but the system is prepared for such adjustments. The plots of FIG. 6 show a horizontal line 110 indicating a Max Booster Gain of 7 and a horizontal line 112 indicating an RBA gain of 1.

(2) From 2.5 to 0.3 inches booster vacuum RBA Gain ramps upward as the booster gain ramps out based upon the vacuum in the apply chamber, according to the following equation:

$$RBA\ Gain = Max\ Booster\ Gain/(Booster\ Vacuum * Gain1 + Offset1).$$

Figure 6:
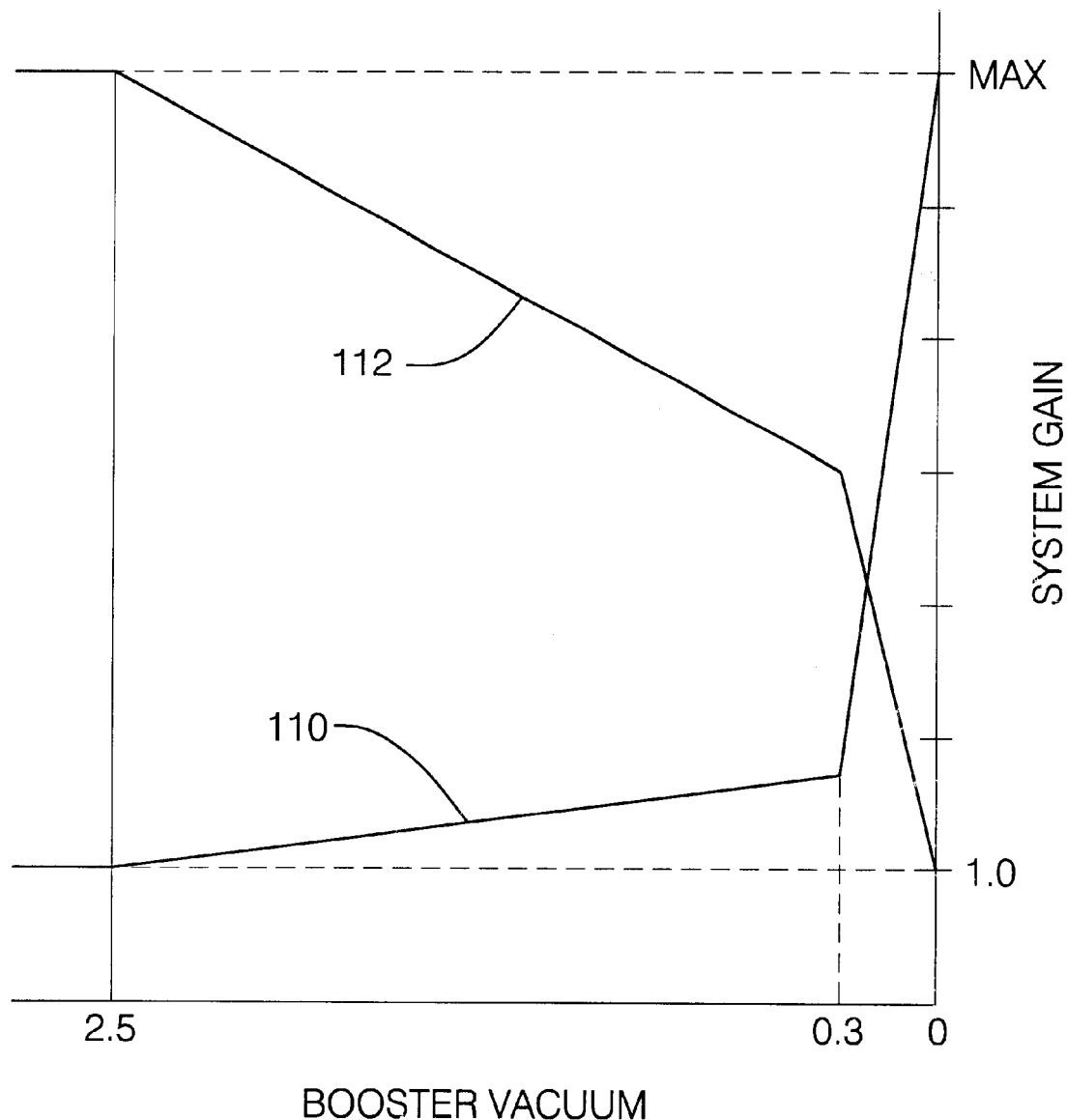
FIG. 6 shows a plot of booster gain near zero booster vacuum as produced by the method of this invention.

Assuming a typical Max Booster Gain of 7, an Gain1 of 1.25 and an Offset1 of 3.75, this equation provides an upward sloping linear segment of plot 110 in FIG. 6 over the range of booster pressure complementary to a downward sloping linear segment of line 112 representing decreasing booster gain in the same region. In this and the following equations, the Booster Vacuum is expressed as a positive number.

From 0.3 to 0 inches booster vacuum, RBA Gain continues to ramp upward as the booster gain continues to ramp out, but at a lower linear rate. The equation used is as follows:

$$RBA\ Gain = Max\ Booster\ Gain/(Booster\ Vacuum * Gain2 + Offset2)$$

Assuming a Gain2 of 10.5 and an Offset2 of 1, this equation provides an additional upward sloping linear segment of plot 110 in FIG. 6 over the range of booster pressure complementary to a corresponding downward sloping linear segment of line 112 representing decreasing booster gain in the same region.

(4) When the vacuum in the apply chamber of the booster reaches zero, the RBA gain is set to a constant value that is equal to the maximum booster gain, as seen in plots 110 and 112 of FIG. 6 at a booster vacuum value of zero (the vertical axis in the Figure). This maximum gain is then locked throughout the entire RBA event even if the vacuum in the apply chamber of the booster rises above zero. The main purpose for locking the gain is to reduce noise and improve pedal feel during pedal pumping maneuvers. At this point the master cylinder pressure is logged for use in the calculation of the target wheel pressure.

Once the RBA Gain is calculated, the program derives the RBA Target Wheel Pressure at step 128. In the region of booster vacuum from 2.5 inches until it reaches 0 inches, the following equation is used:

RBA Target Wheel Pressure=Previous Target Wheel Pressure+ (*RBA* Gain)*(ΔMaster Cylinder Pressure), where ΔMaster Cylinder Pressure is the difference between the present and previous values. Small loop-to-loop errors in Master Cylinder Pressure will be summed together, which is why this equation is only used during the transition into full RBA gain. The extended use of this equation after full runout (booster vacuum reaches 0) may result in a significant error in the Target Wheel Pressure.

When the vacuum in the apply chamber of the booster reaches 0 inch we use the following equation:

RBA Target Wheel Pressure=Target Wheel Pressure(0)+(*RBA* Gain)*(ΔMaster Cylinder Pressure(0)), wherein Target Wheel Pressure(0) is the Target Wheel Pressure at zero Booster Vacuum and ΔMaster Cylinder Pressure(0) is the difference between Master Cylinder Pressure and Master Cylinder Pressure at zero Booster Vacuum. This equation will introduce no loop-to-loop Master Cylinder Pressure errors, since the gain is constant and the increment in Master Cylinder Pressure is always referenced back to the value at zero Booster Vacuum.

After derivation of the RBA Target Wheel Pressure at step 128, the program derives the ISO PWM Voltage at step 130. This first requires determination of the Target Wheel Pressure Error, which is obtained by subtracting the Master Cylinder Pressure, which represents the portion of the total Target Wheel Pressure provided by the vehicle operator and booster, from the Target Wheel Pressure:

Target Wheel Pressure Error=*RBA* Target Wheel Pressure−Master Cylinder Pressure An ISO PWM Voltage corresponding to the RBA Augmentation Pressure is then derived, e.g. by the following equation:

ISO PWM VOLT=(Target Wheel Pressure Error*GAIN3)+OFFSET3,

Where GAIN3 and OFFSET3 are stored calibration constants predetermined for the specific apparatus. Alternatively, the value could be determined in a table lookup.

Next, a pump motor voltage PUMP PWM VOLT is derived in step 132. Although the isolation valve 40 provides the actual pressure control, the pump itself must be operated so as to be able to provide the required pressure through use of the blow-off action of isolation valve 40. PUMP PWM VOLT is based on Target Wheel Pressure Error with a goal of achieving a constant slow motor speed which will reduce pump noise, e.g. according to the following equation:

PUMP *PWM* VOLT=Minimum Pump Voltage+(Target Wheel Pressure Error/GAIN4), where Minimum Pump Voltage and GAIN4 are calibrated constants.

In order to provide enough pump flow to the wheels during all RBA events it may be necessary to increase the pump motor voltage. When Master Cylinder Pressure is increasing, PUMP PWM VOLT is increased by the following amount:

Increase=GAIN5*(ΔTarget Wheel Pressure Error)$^2$

ISO PWM VOLT and the PUMP PWM VOLT are then provided in step 140 as commands to isolation valve 40 and motor M, respectively, before the program returns to step 124.

If step 124 provided a decision to exit RBA, motor M is turned off at step 134 to reduce noise, since further brake fluid flow is not required. This also prevents a vacuum from being formed between prime valve 53 and pump 46. Also, exiting an RBA exit, the isolation valve voltage is ramped down to zero. The rate of the voltage decrement is based upon driver intent. The routine looks at Master Cylinder Pressure to accomplish this. This allows the driver to exit as fast as he would like without forcing him out and causing objectionable pedal feel. A new ISO PWM VOLT is calculated at step 136 according to the following equation:

ISO PWM VOLT=Previous ISO PWM VOLT−GAIN6*ΔMaster Cylinder Pressure

The program next determines if the RBA event is complete. This will not be true until the loop after the ISO PWM VOLT is reduced to zero. When it is, true, the program returns from step 138 to step 120. Until then, the program provides the new, lower value of ISO PWM VOLT to the modulator in step 140 before returning to step 124.

What is claimed is:

1. Method for providing a substantially constant brake assist gain in a vehicle braking system having a vacuum booster providing braking assist to a brake fluid master cylinder in response to an operator input braking force, wherein the vacuum booster provides a booster gain having a maximum value equal to the substantially constant brake assist gain over a substantial portion of its working vacuum range but falling from the maximum value to a unitary value in a non-linear variation over a runout initiating portion of the working vacuum range, the method comprising the steps:

providing a brake fluid pump;
   sensing booster vacuum; and
   responsive to a sensed booster vacuum in the runout initiating portion of the working vacuum range,
   (1) deriving a runout boost assist gain from stored data expressing booster assist gain as a function of booster vacuum;
   (2) deriving a target wheel pressure from the derived runout boost assist gain and a corresponding change in master cylinder pressure;
   (3) determining a target wheel pressure error from the difference between the derived target wheel pressure and the master cylinder pressure;
   (4) activating the brake fluid pump and routing brake fluid from the master cylinder thereto; and
   (5) providing means for controlling pressure of fluid from the brake fluid pump and controlling said pressure in response to the target wheel pressure error.

2. The method of claim 1 wherein the stored data comprise a piecewise linear approximation of the non-linear variation of booster assist gain as a function of booster vacuum in the runout initiating portion of the working vacuum range.

3. The method of claim 1 wherein the change in master cylinder pressure used in the derivation of target wheel pressure is the difference between a currently sensed value of master cylinder pressure corresponding to a currently derived runout boost assist gain and an immediately preceding sensed value of master cylinder pressure.

* * * * *